US006555229B1

(12) United States Patent
Chen et al.

(10) Patent No.: US 6,555,229 B1

(45) Date of Patent: Apr. 29, 2003

(54) FLUOROCARBON-SILICONE RANDOM COPOLYMER FOR USE IN TONER RELEASE LAYER

(75) Inventors: Jiann H. Chen, Fairport, NY (US); Joseph A. Pavlisko, Pittsford, NY (US); Nataly F. Boulatnikov, Ontario, NY (US)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/556,361

(22) Filed: Apr. 24, 2000

(51) Int. Cl.[7] .......................... B32B 5/16; B32B 25/20; B32B 27/30; G03G 15/20

(52) U.S. Cl. ...................... 428/421; 428/447; 428/906; 399/333

(58) Field of Search ............................ 428/36.91, 421, 428/447, 906; 399/333

(56) References Cited

U.S. PATENT DOCUMENTS

| | | | | |
|---|---|---|---|---|
| 4,257,699 A | | 3/1981 | Lentz | 355/3 FU |
| 4,264,181 A | | 4/1981 | Lentz et al. | 355/3 FU |
| 4,272,179 A | | 6/1981 | Seanor | 355/3 FU |
| 4,373,239 A | | 2/1983 | Henry et al. | 29/132 |
| 4,387,176 A | | 6/1983 | Frye | 524/268 |
| 4,430,406 A | | 2/1984 | Newkirk et al. | 430/99 |
| 4,515,884 A | | 5/1985 | Field et al. | 430/99 |
| 4,518,665 A | | 5/1985 | Fujita et al. | 429/153 |
| 4,536,529 A | | 8/1985 | Frye et al. | 524/284 |
| 5,017,432 A | | 5/1991 | Eddy et al. | 428/422 |
| 5,035,950 A | | 7/1991 | Del Rosario | 428/421 |
| 5,292,562 A | | 3/1994 | Fitzgerald et al. | 428/35.8 |
| 5,292,606 A | | 3/1994 | Fitzgerald | 428/35.8 |
| 5,336,539 A | | 8/1994 | Fitzgerald | 428/36.8 |
| 5,464,703 A | | 11/1995 | Ferrar et al. | 428/421 |
| 5,466,533 A | | 11/1995 | Fitzgerald et al. | 428/447 |
| 5,474,821 A | | 12/1995 | Kass | 428/35.8 |
| 5,474,852 A | | 12/1995 | Fitzgerald et al. | 428/447 |
| 5,480,724 A | | 1/1996 | Fitzgerald et al. | 428/447 |
| 5,582,917 A | | 12/1996 | Chen et al. | 428/421 |
| 5,595,823 A | | 1/1997 | Chen et al. | 428/421 |
| 5,709,949 A | * | 1/1998 | Chen et al. | 428/421 |
| 5,906,881 A | | 5/1999 | Chen et al. | 428/141 |
| 5,933,695 A | | 8/1999 | Henry | 399/333 |

FOREIGN PATENT DOCUMENTS

EP 0 969 333 A1 1/2000

* cited by examiner

*Primary Examiner*—D. S. Nakarani
*Assistant Examiner*—Ramsey Zacharia

(57) ABSTRACT

A fuser member comprising a core and a layer overlying the core, the layer including a fluorocarbon random copolymer, a curing agent which cures the fluorocarbon random copolymer, the cured fluorocarbon random copolymer having subunits of:

$$-(CH_2CF_2)x-,\ -(CF_2CF(CF_3))y-,\ \text{or}\ -(CF_2CF_2)z-,$$

wherein x is from 30 to 90 mole percent, y is from 10 to 70 mole percent, z is from 0 to 34 mole percent;

x+y+z equals 100 mole percent.

The layer further including particulate filler having zinc oxide and yellow iron oxide and siloxane polymer comprising one or more curable, silanol-terminated, polyfunctional poly(C1–6 alkyl)siloxane polymers.

16 Claims, 1 Drawing Sheet

FLUOROCARBON-SILICONE RANDOM COPOLYMER FOR USE IN TONER RELEASE LAYER

CROSS REFERENCE TO RELATED APPLICATION

Reference is made to commonly-assigned U.S. patent application Ser. No. 09/558,239, pending, filed concurrently herewith, entitled "Fuser Member Overcoated With Fluorocarbon-Silicone Random Copolymer Containing Aluminum Oxide" by Chen, et al., the disclosure of which is incorporated herein by reference.

FIELD OF THE INVENTION

This invention relates to fuser members useful for heat-fixing a heat-softenable toner material to a substrate. More particularly, the invention relates to materials usable as a toner release layer in a fuser member.

BACKGROUND OF THE INVENTION

Heat-softenable toners are widely used in imaging methods such as electrostatography, wherein electrically charged toner is deposited imagewise on a dielectric or photoconductive element bearing an electrostatic latent image. Most often in such methods, the toner is then transferred to a surface of another substrate, such as, a receiver sheet comprising paper or a transparent film, where it is then fixed in place to yield the final desired toner image.

When heat-softenable toners, comprising thermoplastic polymeric binders, are employed, the usual method of fixing the toner in place involves applying heat to the toner once it is on the receiver sheet surface to soften it and then allowing or causing the toner to cool.

One such well-known fusing method comprises passing the toner-bearing receiver sheet through the nip formed by a pair of opposing rolls, at least one of which (usually referred to as a fuser roll) is heated and contacts the toner-bearing surface of the receiver sheet in order to heat and soften the toner. The other roll (usually referred to as a pressure roll) serves to press the receiver sheet into contact with the fuser roll. In some other fusing methods, the configuration is varied and the "fuser roll" or "pressure roll" takes the form of a flat plate or belt. The description herein, while generally directed to a generally cylindrical fuser roll in combination with a generally cylindrical pressure roll, is not limited to fusing systems having members with those configurations. For that reason, the term "fuser member" is generally used herein in place of "fuser roll" and the term "pressure member" in place of "pressure roll."

The fuser member usually comprises a rigid core covered with a resilient material, which will be referred to herein as a "base cushion layer." The resilient base cushion layer and the amount of pressure exerted by the pressure member serve to establish the area of contact of the fuser member with the toner-bearing surface of the receiver sheet as it passes through the nip of the fuser member and pressure members. The size of this area of contact helps to establish the length of time that any given portion of the toner image will be in contact with and heated by the fuser member. The degree of hardness (often referred to as "storage modulus") and stability thereof, of the base cushion layer are important factors in establishing and maintaining the desired area of contact.

In some previous fusing systems, it has been advantageous to vary the pressure exerted by the pressure member against the receiver sheet and fuser member. This variation in pressure can be provided, for example in a fusing system having a pressure roll and a fuser roll, by slightly modifying the shape of the pressure roll. The variance of pressure, in the form of a gradient of pressure that changes along the direction through the nip that is parallel to the axes of the rolls, can be established, for example, by continuously varying the overall diameter of the pressure roll along the direction of its axis such that the diameter is smallest at the midpoint of the axis and largest at the ends of the axis, in order to give the pressure roll a sort of "bow tie" or "hourglass" shape. This will cause the pair of rolls to exert more pressure on the receiver sheet in the nip in the areas near the ends of the rolls than in the area about the midpoint of the rolls. This gradient of pressure helps to prevent wrinkles and cockle in the receiver sheet as it passes through the nip. Over time, however, the fuser roll begins to permanently deform to conform to the shape of the pressure roll and the gradient of pressure is reduced or lost, along with its attendant benefits. It has been found that permanent deformation (alternatively referred to as "creep") of the base cushion layer of the fuser member is the greatest contributor to this problem.

Particulate inorganic fillers have been added to base cushion layers to improve mechanical strength and thermal conductivity. High thermal conductivity is advantageous when the fuser member is heated by an internal heater, so that the heat can be efficiently and quickly transmitted toward the outer surface of the fuser member and toward the toner on the receiver sheet it is intended to contact and fuse. High thermal conductivity is not so important when the roll is intended to be heated by an external heat source.

Optimal metal-particle filled elastomer fuser members have long been sought. At one time, it was predicted that:

"The metal of the metal-containing filler dispersed in the elastomer may be easily selected by one skilled in the art without undue experimentation by testing the metal-containing filler, such as a metal, metal alloy, metal oxide, metal salt or other metal compound, in an elastomer. The general classes of metals which are applicable to the present invention include those metals of Groups Ib, 2; 2b, 3; 3b, 4a, 4b, 5; 5b, 6b, 7b, 8 and the rare earth elements of the Periodic Table." (U.S. Pat. No. 4,264,181 to Lentz et al, column 10, lines 42–53; also U.S. Pat. No. 4,272,179 to Seanor, column 10, lines 45–54.)

This prediction of easy selection of the metal for a metal-containing filler is not correct in view of subsequent work.

A metal-containing filler which provides good results in one elastomer may provide very poor results in another elastomer, even if the elastomers are very similar.

U.S. Pat. No. 4,515,884 to Field et al, discloses a fuser member which utilizes metal oxide filled polydimethylsiloxane. The metal oxides are iron oxide and tabular alumina. Calcined alumina is described as being unsuitable per se. (column 9. line 50-column 10, line 47.)

In U.S. Pat. No. 4,264,181 to Lentz et al, good results were obtained when lead oxide was used as a filler in various fluorocarbon elastomers (Viton E430, Viton E605C, Viton GH™; Examples X, XI, XII). In U.S. Pat. No. 5,017,432 to Eddy et al, on the other hand, teaches that oxide fluorocarbon elastomers (for example, Viton GF™) would produce an unacceptable fuser member. In fluoroelastomers, cupric oxide is preferred.

U.S. Pat. No. 4,272,179 to Seanor and U.S. Pat. Nos. 4,264,181 and 4,257,699 to Lentz teach the use, as a release oil, of a polydimethylsiloxane that incorporates mercapto functional groups. These patents indicate that lead oxide filler in the outer elastomer release layer interacts with the mercapto functionalized PDMS fluid to yield a release film on the surface of the fuser member.

Preparation of metal containing elastomers remains problematic. U.S. Pat. No. 4,515,884 to Field et al, and U.S. Pat. No. 5,017,432 to Eddy et al, cite large numbers of critical features or important aspects of their metal containing elastomers: choice of material (Field, column 9, lines 50–65 and column 10, lines 24–25), interaction of filler surface and elastomer (Field, column 9, lines 32–65), particle size (Field, column 10, lines 1–8 and lines 25–30; Eddy, column 9, line 65-column 10, line 3), concentration of metal-filler (Field, column 10, lines 9–23 and lines 31–47), capability of interacting with functional groups of release agent (Eddy, column 9, lines 26–30), reactivity of the metal filler with the elastomer (Eddy, column 9, lines 33–43), and acid-base characteristics of the metal filler (Eddy, column 9, lines 43–56). The lists of critical features and important aspects in Field and Eddy do not fully correlate. It is unknown whether this difference represents real differences in material characteristics or only differences in techniques and analysis.

In electrophotographic fuser systems, fuser members are commonly made with an overcoat release layer of polysiloxane elastomer, polyfluorocarbon resin, or polyfluorocarbon elastomer.

Polysiloxane elastomers have relatively high surface energy and relatively low mechanical strength, but are adequately flexible and elastic and can produce high quality fused images. After a period of use, however, the self release property of the roller degrades and offset begins to occur. Application of a polysiloxane fluid during roller use enhances the ability of the roller to release toner, but shortens roller life due to oil absorption. Oiled portions tend to swell and wear and degrade faster.

One type of material that has been widely employed in the past to form a resilient base cushion layer for fuser rolls is condensation-crosslinked siloxane elastomer. Disclosure of filled condensation-cured poly(dimethylsiloxane) "PDMS" elastomers for fuser rolls can be found, for example, in U.S. Pat. Nos. 4,373,239; 4,430,406; and 4,518,655. U.S. Pat. No. 4,970,098 to Ayala-Esquillin et al teaches a condensation cross-linked diphenylsiloxane-dimethylsiloxane elastomer having 40 to 55 weight percent zinc oxide, 5 to 10 weight percent graphite, and 1 to 5 weight percent ceric dioxide.

A widely used siloxane elastomer is a condensation-crosslinked PDMS elastomer, which contains about 32–37 volume percent aluminum oxide filler and about 2–6 volume percent iron oxide filler, and is sold under the trade name, EC4952, by the Emerson Cummings Co., U.S.A. It has been found that fuser rolls containing EC4952 cushion layers exhibit serious stability problems over lime of use, i.e., significant degradation, creep, and changes in hardness, that greatly reduce their useful life. Mechanical energy resolver (MER) test results correlate with and thus accurately predict the instability exhibited during actual use. Nevertheless, materials such as EC4952 initially provide very suitable resilience, hardness, and thermal conductivity for fuser roll cushion layers. See U.S. Pat. No. 5,595,823.

U.S. Pat. No. 5,582,917 discloses toner fusing members which have a substrate coated with a fluorocarbon-silicone polymeric composition. Although these toner fusing members have proved effective they have a problem in that there can be toner contamination and may have a problem with mechanical strength. The advantage of using the fluorocarbon silicone compositions is that they are effective for use with toner release agents which typically include silicone.

SUMMARY OF THE INVENTION

It is an object of the invention to provide materials for forming a toner release layer.

It is another object of the present invention to provide a fuser member which makes use of fluorocarbon silicone but which has improved toner release and mechanical strength.

These objects are achieved by a fuser member comprising a core and a layer overlying the core, the layer including a fluorocarbon random copolymer, a curing agent which cures the fluorocarbon random copolymer, the cured fluorocarbon random copolymer having subunits of:

$$—(CH_2CF_2)x—, —(CF_2CF(CF_3))y—, \text{ or } —(CF_2CF_2)z—,$$

wherein x is from 30 to 90 mole percent, y is from 10 to 70 mole percent, z is from 0 to 34 mole percent;

x+y+z equals 100 mole percent;

the layer further including particulate filler having zinc oxide and yellow iron oxide; and a siloxane polymer comprising one or more curable, silanol-terminated, polyfunctional poly(C1–6 alkyl) siloxane polymers.

It is a feature of the present invention that a fuser member formed with a toner release layer that includes a metal oxide filled polyfluorocarbon elastomer has a moderate surface energy and that by using a fluorocarbon-silicone polymeric composition an improved fuser member is provided. Zinc and iron oxide when added to the claimed combination provide improved mechanical strength and reduce toner contamination.

A further advantage of the present invention is a higher image gloss is attainable.

A further advantage of the present invention is that the need for strong bases to cure the fluoroelastomer is eliminated.

DETAILED DESCRIPTION OF PARTICULAR EMBODIMENTS

Figure 1:
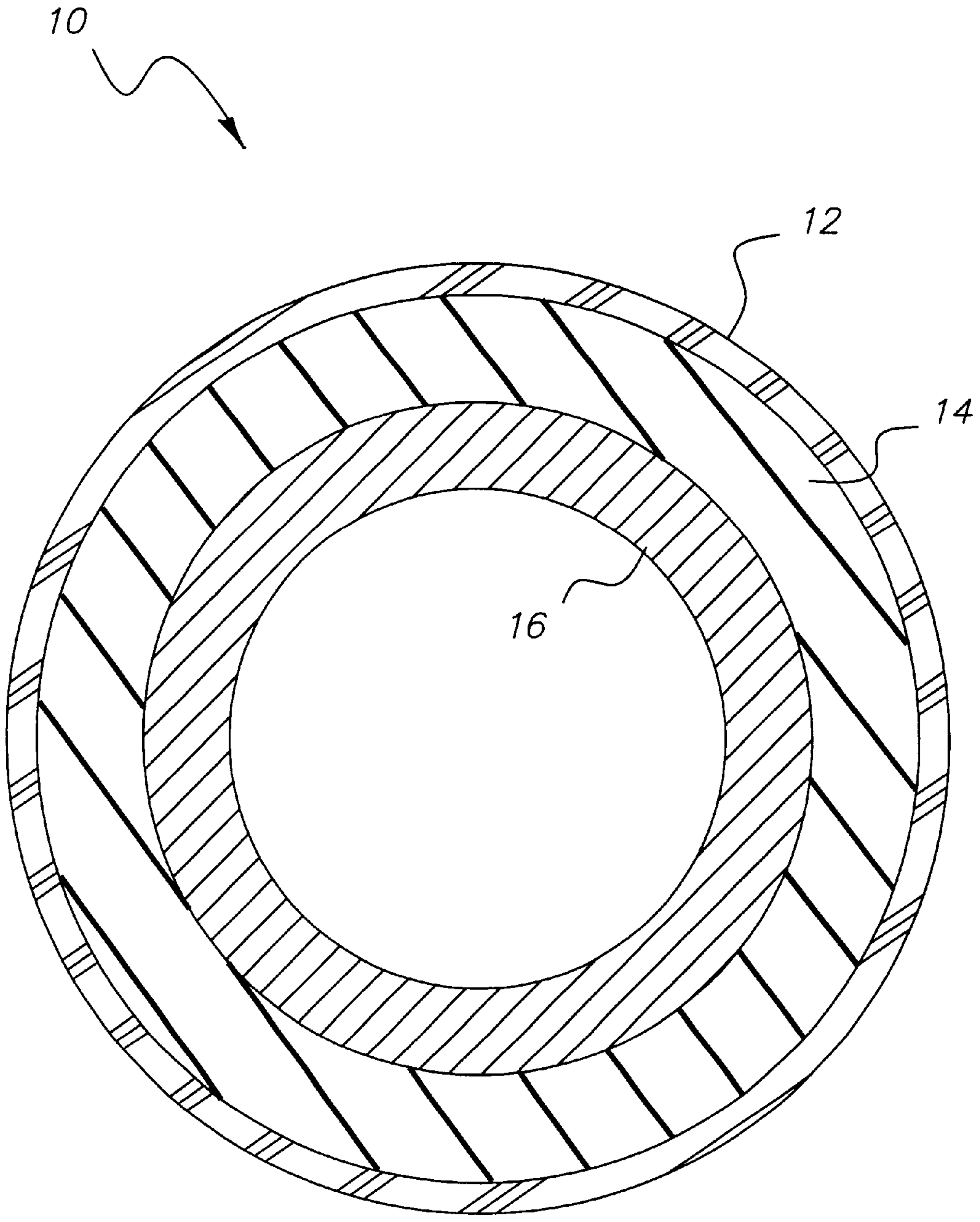
FIG. 1 is a cross-sectional view of a fusing member in accordance with the present invention.

FIG. 1 shows a cross sectional view of a fuser member 10 which include a fuser roller, pressure roller, oiler donor roller, oiler metering roller, or pre-conditioning roller, etc. The core 16 is usually metallic, such as stainless steel, steel, aluminum, etc.; however, the core 16 may also be made of a ceramic or plastic. The primary requisites for core 16 materials are that it provide the necessary stiffness, be able to support the force placed upon it, and be able to withstand whatever temperature to which it is subjected. Disposed above the core 16 lies one or more optional intermediate layers 14 which are characterized in the art as cushion layers. The outermost layer 12 is a toner release layer. In the event that a cushion layer 14 is desired, then the outermost layer 12 is disposed directly over the core 16. The outermost layer 12 is the toner release layer, it includes a curing agent and a fluorocarbon random copolymer that is cured by the curing agent, the fluorocarbon random copolymer has subunits of:

$—(CH_2CF_2)x—$ (vinylidene fluoride subunit ("$VF_2$")), $—(CF_2CF(CF_3))y—$ (hexefluoropropylene subunit ("HF")), and $—(CF_2CF_2)z—$ (tetrafluoroethylene subunit ("TFE"))

wherein x is from 30 to 90 mole percent;

y is from 10 to 70 mole percent;

z is from 0 to 34 mole percent;

x+y+z equals 100 mole percent;

the layer further including particulate filler having zinc oxide and yellow iron oxide.

In these formulas, x, y, and z are mole percentages of the individual subunits relative to a total of the three subunits (x+y+z), referred to herein as "subunit mole percentages" (The curing agent can be considered to provide an additional "cure-site subunit", however, the contribution of these cure-site subunits is not considered in subunit mole percentages.) In the fluorocarbon copolymer, x has a subunit mole percentage of from 30 to 90 mole percent, y has a subunit mole percentage of from 10 to 70 mole percent, and z has a subunit mole percentage of from 0 to 34 mole percent. In a currently preferred embodiment of the invention, subunit mole percentages are: x is from 40 to 80, y is from 10 to 60, arid z is from 0 to 34; or more preferably x is from 42 to 75, y is from 14 to 58, and z is 0. In the currently preferred embodiments of the invention, x, y, and z are selected such that fluorine atoms represent at least 70 percent of the total formula weight of the $VF_2$, HFP, and TFE subunits.

Preferably, curable polyfunctional poly(C1–6 alkyl) siloxane polymers are also used in the present invention and are cured concurrently with the fluorocarbon random copolymer when cured by the curing agent to produce a coating suitable for use as the toner release layer of a fusing member. In accordance with the invention, coated fusing members have low energy surfaces which release toner images with minimal offset. These coatings can also be advantageously used with small amounts of externally added polymeric release agents, for example mercapto functionalized polydimethylsiloxanes, to further minimize offset. Preferred curable polyfunctional poly(C1–6 alkyl)siloxane polymers are heat-curable silicones, however peroxide-curable silicones can also be used with conventional initiators. Heat-curable silicones include the hydroxy-functionalized polyfunctional organopolysiloxanes belonging to the class of silicones known as "soft" silicones. Preferred soft silicones are silanol-terminated polyfunctional organopolysiloxanes containing repeating units of the formula, $$(R1)_aSiO_{(4-a)2}$$

wherein R1 is C1–6 alkyl and a is 0 to 3. Alkyl groups which R1 can represent include methyl, ethyl, propyl, isopropyl, butyl, sec. butyl, pentyl and hexyl. Preferred soft silicones are those in which R1 is methyl. The soft silicones can be used singly or as mixtures of silicones and can contain various proportions of mono-, di-, tri- and tetra-functional siloxane repeating units. Preferred soft silicones comprise a major component of a silanol- or trimethylsilyl-terminated polydimethylsiloxane having a number-average molecular weight between about 20,000 to 300,000 and a minor component of a polymethylsiloxane comprising monofunctional and tetrafunctional siloxane repeating units and having a number-average molecular weight in the range of 1,000 to 10,000. Exemplary soft silicones are commercially available or can be prepared by conventional methods, for example, SFR-100 silicone (sold by General Electric Co.) and EC 4952 silicone (sold by Emerson Cummings Co.) SFR-100 silicone is characterized as a silanol- or trimethylsilyl-terminated polymethylsiloxane and is a liquid blend comprising about 60–80 weight percent of a difunctional polydimethylsiloxane having a number-average molecular weight of about 150,000, and 20–40 weight percent of a polytrimethylsilyl silicate resin having monofunctional (i.e. trimethylsiloxane) and tetrafunctional (i.e. $SiO_2$) repeating units in an average ratio of between about 0.8 and 1 to 1 and having a number-average molecular weight of about 2,200. EC 4952 silicone is characterized as a silanol-terminated polymethylsiloxane having about 85 mole percent of difunctional dimethylsiloxane repeating units, about 15 mole percent of trifunctional methylsiloxane repeating units and having a number-average molecular weight of about 21,000. Other polyfunctional poly(C1–6 alkyl)siloxane polymers which can be used are disclosed in U.S. Pat. Nos. 4,387,176 and 4,536, 529, the disclosures of which are hereby incorporated by reference.

In one aspect of the invention a fluorocarbon-silicone composite is obtained which can be used as a fusing roll layer without adding release agents and with-out causing offset. Suitable fluorocarbon polymers are the terpolymers of vinylidene fluoride, hexafluoropropylene and tetrafluorethylene having a fluorine content of at least about 70 mole percent as disclosed in U.S. Pat. No. 5,035,950. The silicone component of the composite is a soft silicone, for example, a polymethylsiloxane composition such as SFR-100 silicone.

Preferred composites of the invention have a ratio of siloxane polymer to fluorocarbon copolymer between about 0.1 and 3 to 1 by weight, preferably between about 0.2 and 0.5 to 1. The composite is preferably obtained by curing a mixture comprising from about 50–70 weight percent of a fluorocarbon copolymer, 10–30 weight percent of a curable polyfunctional polymethylsiloxane polymer, most preferably about 20–30 weight percent. 1–10 weight percent of a fluorocarbon-curing agent, 1–3 weight percent of a fluorocarbon-curing accelerator, 8–30 weight percent of an acid acceptor type filler, and 10–30 weight percent of an inert filler.

Curing of the composite is carried out according to the well known conditions for curing vinylidene fluoride based copolymers ranging, for example, from about 12–48 hours at temperatures of between 50° C. to 250° C. Preferably the coated composition is dried until solvent free at room temperature, then gradually heated to about 230° C. over 24 hours, then maintained at that temperature for 24 hours.

The outer layer includes particulate filler comprising zinc oxide and yellow iron oxide. In a currently preferred embodiment of the invention, the zinc oxide is present in an amount from 5 to 30 parts by weight based on 100 parts by weight of the fluorocarbon random copolymer. The yellow iron oxide is present in an amount from 5 to 30 parts by weight based on 100 parts by weight of fluorocarbon random copolymer. Concentrations of zinc oxide and iron oxide of greater than that that specified will provide no special benefit unless higher thermal conductivity is required. In a particular embodiment of the invention, the outer layer has 3.22 volume percent (10 parts) yellow iron oxide, and 3.01 volume percent (10 parts) ZnO.

The composition may further include other fillers to impart such properties as thermal conductivity or cosmetic purposes. A brief list of such fillers includes but is not limited to tin oxide, copper oxide, graphite, carbon black, and aluminum oxide.

The zinc oxide particles employed as filler in the base cushion layer of a fuser member of the invention can be obtained from convenient commercial source, e.g., Atlantic Equipment Engineers of Bergenfield, N.J. The particle size is important to control surface properties. Particle sizes less than 10 micrometers have been found to be acceptable. In the examples presented below the zinc oxide particles were from 1 to 5 micrometers in diameter.

The yellow iron oxide particles employed as filler in the base cushion layer of a fuser member of the invention can be obtained from any convenient commercial source, e.g., Atlantic Equipment Engineers of Bergenfield, N.J. The particle size is important to control surface properties. Particle sizes less than 10 micrometers have been found to be acceptable. In the examples presented below the zinc oxide particles were from 1 to 5 micrometers in diameter.

To form the outer layer, the filler particles are mixed with the uncured polymer, crosslinking agent, and any other additives, such as an accelerator; shaped over the base cushion, and cured. The fluorocarbon is cured by crosslinking with basic nucleophile addition curing. Basic nucleophilic cure systems are well known and are discussed, for example, in U.S. Pat. No. 4,272,179. One example of such a cure system combines a bisphenol as the crosslinking agent and an organophosphonium salt, as an accelerator.

The crosslinker is incorporated into the polymer as a cure-site subunit, for example, bisphenolic residues. Other examples of nucleophilic addition cure systems are sold commercially as DIAK No. I (hexamethylenediamine carbamate) and DLAK No. 3 (N,N'-dicinnamylidene-1,6-hexanediamiine) by E. I. duPont de Nemours & Co.

Suitable uncured polymers are available commercially. In a particular embodiment of the invention, a vinylidene fluoride-co-hexafluoropropylene was used which can be represented as —(VF)(75)—(HFP)(25)—. This material is marketed by E. I. duPont de Nemours and Company under the designation "Viton A" and is referred to herein as "Viton A". In another embodiment of the invention, a vinylidene fluoride-co-hexafluoropropylene was used which can be represented as —(VF)(42)—(HFP)(58)—. This material is marketed by Minnesota Mining and Manufacturing, St. Paul, Mint, under the designation "Fluorel FX-2530" and is referred to herein as "FX-2S30". Other suitable uncured vinylidene fluoride-cohexafluoropropylenes and vinylidene fluoride-co-tetrafluoroethylene-cohexafluoropropylenes are available, for example, Fluorel FX-9038.

The fuser member is constructed forming a toner release layer on a overlying an optional base cushion provided on a core comprising the steps of:

(a) providing a core;

(b) providing a mixture having:

(i) a fluorocarbon random copolymer having subunits of:

$$—(CH_2CF_2)x—, —(CF_2CF(CF_3))y—, \text{ or } —(CF_2CF_2)z—,$$

wherein x is from 30 to 90 mole percent, y is from 10 to 70 mole percent, z is from 0 to 34 mole percent;

x+y+z equals 100 mole percent;

(ii) a particulate filler having zinc oxide and yellow iron oxide; and (iii) a crosslinking agent and a crosslinking accelerator; and (iv) a siloxane polymer comprising one or more curable, silanol-terminated, polyfunctional poly (C1–6 alkyl)siloxane polymers, the siloxane polymer comprising at least two different functional siloxane units selected from the group consisting of monofunctional, difunctional, trifunctional and tetrafunctional siloxane units, and creating an interpenetrating network consisting essentially of separately crosslinked polymers, the fluorocarbon polymer and the fluorocarbon curing agent forming one crosslinked polymer, and the siloxane polymer forming a second crosslinked polymer; and (c) applying the mixture to the base cushion and curing the applied mixture to crosslink the fluorocarbon random copolymer.

In cases where it is intended that the fuser member be heated by an internal heater, it is desirable that outer layer have a relatively high thermal conductivity, so that the heat can be efficiently and quickly transmitted toward the outer surface of the fuser member that will contact the toner intended to be fused. (Depending upon relative thickness, it is generally even more desirable that the base cushion layer arid any other intervening layers have a relatively high thermal conductivity. Suitable materials for the base cushion layer are discussed below).

Some fusing systems use a release oil, such as a PDMS oil, to prevent offset, that is, to aid the roll in releasing from the toner it contacts during the fusing operation. During use, the oil is continuously coated over the surface of the fuser member in contact with the toner image. The fuser member of the invention can be used with polydimethylsiloxane, amino functionalized polydimethylsiloxane or mercapto functionalized polydimethylsiloxane release oils at normally used application rates or at reduced application rates, from about 0.5 mg/copy to 10 mg/copy (the copy is 8.5 by 11 inch 20 pound bond paper.)

The outer layer of the fuser member of the invention is substantially resistant to release oil induced swelling. In a preferred embodiment of the invention, the change in size due to swelling is less than 0.1 to 1.0 percent. In an even more preferred embodiment of the invention, the change in size due to swelling is less than 0.01 to 0.1 percent.

The thickness of the base cushion and outer layers and the composition of the base cushion layer can be chosen so that the base cushion layer can provide the desired resilience to the fuser member, and the outer layer can flex to conform to that resilience. The thickness of the base cushion and outer layers will be chosen with consideration of the requirements of the particular application intended. Usually, the outer layer would be thinner than the base cushion layer. For example, base cushion layer thickness in the range from 0.6 to 5.0 mm have been found to be appropriate for various applications. In some embodiments of the present invention, the base cushion layer is about 2.5 mm thick, and the outer layer is from about 25 to 30 micrometers thick.

Suitable materials for the base cushion layer include any of a wide variety of materials previously used for base cushion layers, such as the condensation cured polydimethylsiloxane marketed as EC4952 by Emerson Curning. An example of a condensation cured silicon rubber base cushion layer is GE 4044 marketed by General Electric of Waterford, N.Y. An example of an addition cured silicone rubber is Silastic J RTV marketed by Dow Corning applied over a silane primer DC-1200 also marketed by Dow Coming.

In a particular embodiment of the invention, the base cushion is resistant to cyclic stress induced deformation and hardening. Such materials when subjected to cyclic stress using an MER, as above discussed, exhibit changes in length and hardness (storage modulus) of less than about 20 percent. Examples of suitable materials are filled condensation-crosslinked PDMS elastomers disclosed in U.S. Pat. No. 5,269,740 (copper oxide filler), U.S. Pat. No. 5,292,606 (zinc oxide filler), U.S. Pat. No. 5,292,562 (chromium oxide filler), U.S. Pat. No. 5,480,724 (tin oxide filler), U.S. Pat. No. 5,336,539 (nickel oxide filler). These materials all show reasonable heat conductivities and much less change in hardness and creep than EC4952 or the PDMS elastomer with aluminum oxide filler. Additional suitable base cushions are disclosed in U.S. Pat. Nos. 5,466,533; 5,474,852, and 5,464,703, the disclosures of which are hereby incorporated herein by reference.

The core of the fuser member is usually cylindrical in shape. It comprises any rigid metal or plastic substance. Metals are preferred when the fuser member is to be internally heated, because of their generally higher thermal conductivity. Suitable core materials include, e.g., aluminum, steel, various alloys, and polymeric materials such as thermoset resins, with or without fiber reinforcement. The core can be a support which has been conversion coated and primed with metal alkoxide primer in accordance with U.S. Pat. No. 5,474,821, which is hereby incorporated by reference.

The fuser member is mainly described herein in terms of embodiments in which the fuser member is a fuser roll having a core, a base cushion layer overlying the core, and an outer layer superimposed on the base cushion. The invention is not, however, limited to a roll, nor is the invention limited to a fusing member having a core bearing two layers: the base cushion layer and the outer layer. The fuser member of the invention can have a variety of outer configurations and layer arrangements known to those skilled in the art. For example, the base cushion layer could be eliminated or the outer layer described herein could be overlaid by one or more additional layers.

The invention is further illustrated by the following Examples and Comparative Examples.

EXAMPLES 1–7

A cylindrical stainless steel core was cleaned with dichioromethane and dried. The core was then primed with a uniform coat of a metal alkoxide type primer, Dow 1200 RTV Prime Coat primer, marketed by Dow Corning Corporation of Midland, Mich.; which contains: light aliphatic petroleum naptha (85 weight percent), tetra (2-methoxyethoxy)-silane (S weight percent), tetrapropyl orthosilicate (5 weight percent), and tetrabutyl titanate (5 weight percent). Silastic.RTM. J RTV room temperature vulcanizing silicone rubber, marketed by Dow Corning Corporation of Midland, Mich.; was then mixed with catalyst and injection molded onto the core and cured at 232° C. for 2 hours under 75 tons/inch$^2$ of pressure. The roller was then removed from the mold and baked in a convection oven with a temperature ramp increasing to 23° C. substantially uniformly over 24 hours and then maintaining that temperature for an additional 24 hours. After air cooling, EC4952 marketed by Emerson Cumming Division of W. R. Grace and Co. of Connecticut was blade coated directly onto the Silastic J layer, then cured for 12 hours at about 210° C., followed by 48 hours at 218° C. in a convection oven. After air cooling, the EC4952 was ground to a thickness of 20 mils. The cured EC4952 was corona discharged for 15 minutes at 750 watts and an outer layer was applied.

Fluorocarbon polymer and soft silicone SFR-100 was mixed as indicated in Table 1 with varying amounts of yellow iron oxide and zinc oxide. The volume fraction of yellow iron oxide was held constant. Each of the formulations was mixed with 2.5 g of Viton Curative 20 and 6 g of Viton curative 30. The formulations were all mixed on a two-roll mill then dissolved to form a 25 weight percent solids solution in methyl ethyl ketone. Part of the resulting material was ring coated onto the cured EC4952 layer, air dried for 16 hours, baked with 24 hour ramp to 260° C. and then a 24 hour soak at 260° C. The Silastic J layer had a thickness of 380 mils. The resulting outer layer of fluorocarbon polymer had a thickness of 1 mil. The remainder of the material was cast to a film and allowed to dry for 3 days. Afterwards the cast films were baked with 24 hour ramp to 260° C. and then a 24 hour soak at 260° C.

EXAMPLES 8–12

Substantially the same procedures were followed as in Example 1–7, except yellow iron oxide content was varied and the volume fraction of zinc oxide was held constant as indicated in Table 1.

COMPARATIVE EXAMPLES 1–3

Substantially the same procedures were followed as in Examples 1–7, except that in lieu of yellow iron oxide, brown iron oxide was added as indicated in Table 2.

COMPARATIVE EXAMPLE 4

Substantially the same procedures were followed as in Examples 1–7, except that no yellow iron oxide or brown iron oxide was added.

MATERIALS TESTING

The mechanical properties were measured on an Instron Model 4206 Series IX Materials Testing System 5. Tensile stress-at-break, strain-at-break, and Young's modulus were measured using a 100 lb load cell. The crosshead speed was 2 in/min. Temperature was 73° F. Specimen gauge length was 16.51 mm. Five replicate measurements were made according to ASTM test methods #77.

In order to determine the extent of cure samples of the plaques of the examples and counter examples were swollen in Methylethylketone (MEK) for 2 days at room temperature. The swell was calculated as the percentage increase in mass. As the uncured fluoroelastomer dissolves completely, the lower the MEK swell the more cured. Different advantages are seen from varying the degree of cure a higher degree of cure (lower MEK swell) will in general have more mechanical integrity and better wear resistance. However as the cure propagates through vinylidene fluoride which is also the site which can react with functionalized release fluids a lower degree of cure (higher MEK swell) can signify a higher potential to interact with functionalized release fluids.

The wear rate test of compression-molded slabs was performed using a Norman Abrader Device (Norman Tool Inc., Ind.) For this test, the Abrader Device was modified by replacing the standard grommet wheel with an aluminum rod (1.1 inch in length and 0.625 inch in diameter), placing a renewable paper strip on the samples, and running the tests at about 350° F. 480 cycles were ran on each sample and the depth of the wear track was measured on a Federal Surfanalyzer 4000.

TONER RELEASE TEST

The test samples are employed to evaluate the toner offset and release force characteristics of the fuser member coating. Two samples are cut approximately 1-inch square of each example. One of these squares is left untreated by release agent (the dry sample). To the surface of the other sample is applied in unmeasured amount of Xerox amino-functionalized PDMS 8R79.

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample is tested in the following manner:

A one-inch square of paper covered with unfused polyester toner is placed in contact with a sample on a bed heated to 175° C., and a pressure roller set for 80 psi is locked in place over the laminate to form a nip. After 20 minutes the roller is released from the laminate.

The extent of offset for each sample is determined by microscopic examination of the sample surface following delamination. The following numerical evaluation, corresponding to the amount of toner remaining on the surface, is employed.

1 0% offset 2 1–20% offset 3 21–50% offset 4 51–90% offset 5 91–100% offset

Qualitative assessment of the force required for delamination of the paper from the sample is as follows:

1 low release force 2 moderate release force 3 high release force

The plaques of the mixtures were cast into aluminum boats for cure. It was noticed and completely unexpected that significant improvements to the adhesion of the fluoroelastomer to aluminum were achieved. The adhesion of the materials to the aluminum was measured by peeling the coating off the aluminum on the Instron described above. Results are shown in Table 6.

TABLE 1

| Sample | Viton A: SFR 100 (g) | Volume Fraction ZnO | Volume Fraction Yellow Fe2O3 |
|---|---|---|---|
| E1 | 100/20 | 0.2 | 3.22 |
| E2 | 100/20 | 0.5 | 3.22 |
| E3 | 100/20 | 1 | 3.22 |
| E4 | 100/20 | 2 | 3.22 |
| E5 | 100/20 | 5 | 3.22 |
| E6 | 100/20 | 7 | 3.22 |
| E7 | 100/20 | 10 | 3.22 |
| E8 | 100/20 | 3.01 | 0.5 |
| E9 | 100/20 | 3.01 | 1 |
| E10 | 100/20 | 3.01 | 2 |
| E11 | 100/20 | 3.01 | 5 |
| E12 | 100/20 | 3.01 | 10 |

TABLE 2

| Sample | Viton A: SFR 100 (g) | Volume Fraction ZnO | Volume Fraction Brown Fe2O3 |
|---|---|---|---|
| CE1 | 100/20 | 3.01 | 1 |
| CE2 | 100/20 | 3.01 | 3 |
| CE3 | 100/20 | 3.01 | 6 |
| CE4 | 100/20 | 0 | 0 |

TABLE 3

| Volume Fraction ZnO | MEK swell (%) |
|---|---|
| E1 | 155.0 |
| E2 | 163.0 |
| E3 | 95.5 |
| E4 | 125.0 |
| E5 | 122.0 |
| E6 | 90.1 |
| E7 | 103.0 |
| E8 | 207 |
| E9 | 196 |
| E10 | 180 |
| E11 | 126 |
| E12 | 38.5 |
| CE1 | 260 |
| CE2 | 496 |
| CE3 | 382 |

Table 3 shows the significant improvement to the extent of cure of the fluoroelastomer-siloxane polymer as evidenced by the dramatic decrease in the MEK swell by the incorporation of the yellow iron oxide. Table 3 further shows that brown iron oxide (CE1–CE3) does not similarly decrease the MEK swell.

TABLE 4

| Sample | Stress-at-Break (MPa) | Strain-at-Break | % Modulus (MPa) |
|---|---|---|---|
| E8 | 2.09 | 293 | 4.64 |
| E9 | 2.67 | 369 | 6.60 |
| E10 | 2.61 | 289 | 5.45 |
| E11 | 6.92 | 448 | 17.0 |
| E12 | 8.83 | 371 | 19.3 |

Table 4 shows that the presence or absence of the yellow iron oxide does not significantly affect the strain-at-break. However, significant improvements are seen to both the toughness and the stress-at-break.

TABLE 5

| Sample | Stress-at-Break (MPa) | Strain-at-Break (MPa) | Toughness (MPa) |
|---|---|---|---|
| E9 | 2.67 | 370 | 6.60 |
| E10 | 2.61 | 289 | 5.45 |
| E11 | 6.92 | 449 | 17.0 |
| E12 | 8.83 | 371 | 19.3 |
| CE1 | 2.23 | 323 | 3.58 |
| CE2 | 2.89 | 419 | 3.52 |
| CE3 | 3.42 | 496 | 4.38 |
| CE4 | 5.02 | 123 | 3.50 |

Table 5 shows a comparison between the use of the two different forms of iron oxide, yellow or brown against no iron oxide is added. Table 4 shows similar stress-at-breaks until higher amounts of yellow iron oxide are incorporated. For the most part large of difference in toughness is observed in the mechanical properties for the different choices of types of iron oxide.

TABLE 6

| Sample | wear | release | dry offset | amino offset |
|---|---|---|---|---|
| E9 | 4.00 | 1 | 2.00 | 1.5 |
| E10 | 1.70 | 1 | 1.80 | 1.2 |
| E11 | 0.60 | 1 | 1.80 | 1.5 |
| CE1 | 4 | 1 | 2.00 | 2 |

TABLE 6-continued

| Sample | wear | release | dry offset | amino offset |
|---|---|---|---|---|
| CE2 | 4 | 2 | 2.00 | 2 |
| CE3 | 1.3 | 2 | 2.00 | 1.5 |

Table 6 shows the effect of the use of the two different types of iron oxide, yellow (E9–E11) and brown (CE1–CE3). In terms of wear, the choice of iron oxide significantly impacts the materials properties. The use of brown iron oxide (CE1–CE3) detrimentally impacts release. While not tremendously affecting the dry offset of the material, the amino offset is not aided by the use of brown iron oxide (CE 1–CE3) as it is by the yellow iron oxide (E9–E11).

TABLE 7

| Volume Fraction ZnO | Adhesion to Aluminum (g/6mm) |
|---|---|
| E1 | 85.2 |
| E2 | 63.5 |
| E3 | 63.1 |
| E4 | 42.7 |
| E5 | 55.0 |
| E6 | 57.4 |
| E7 | 55.9 |
| E8 | 172.8 |
| E9 | 184.4 |
| E10 | 77.8 |
| E11 | 29.1 |
| E12 | 171.1 |
| CE1 | 125.7 |
| CE2 | 74.6 |
| CE3 | 29.7 |
| CE4 | 25.6 |

Table 7 shows the dramatic effect of the incorporation of iron oxide, both yellow and brown, of the ability of the fluoroelastomer-siloxane polymer to adhere to aluminum.

The above data and description show that the combination of yellow iron oxide in conjunction with zinc oxide to replace the in general basic metal oxide metal hydroxide shows significant improvement of attainable properties. The positive attributes such as resistance to wear, extent of cure, stress-at-break and adhesion to aluminum are maximized while negative attributes such as propensity to offset, lack of release, and excessive strain-at-break are minimized.

The invention has been described in detail with particular reference to certain preferred embodiments thereof, but it should be appreciated that variations and modifications can be effected within the scope of the invention.

PARTS LIST 10 fuser member 12 outermost layer 14 intermediate layer 16 core

What is claimed is:

1. A fuser member comprising a core and a layer overlying the core, the layer including a fluorocarbon random copolymer, a curing agent which cures the fluorocarbon random copolymer, the cured fluorocarbon random copolymer having subunits of:

$$—(CH_2CF_2)x—, —(CF_2CF(CF_3))y—, \text{ or } —(CF_2CF_2)z—,$$

wherein x is from 30 to 90 mole percent, y is from 10 to 70 mole percent, z is from 0 to 34 mole percent;

x+y+z equals 100 mole percent;

the layer further including particulate filler having zinc oxide and yellow iron oxide; and a siloxane polymer comprising one or more curable, silanol-terminated, polyfunctional poly(C1–6 alkyl) siloxane polymers.

2. The fusing member of claim 1 wherein the siloxane polymer comprises at least two different functional siloxane units selected from the group consisting of monofunctional, difunctional, trifunctional and tetrafunctional siloxane units, and creating an interpenetrating network to cure the fluorocarbon random copolymer forming separately crosslinked polymers, the fluorocarbon polymer and the fluorocarbon curing agent forming one crosslinked polymer, and the siloxane polymer forming a second crosslinked polymer.

3. The fuser member of claim 2 further including a cushion layer on the core.

4. The fuser member of claim 1 wherein the zinc oxide is present in an amount from 5 to 30 parts by weight based on 100 parts by weight of fluorocarbon random copolymer.

5. The fuser member of claim 1 wherein the yellow iron oxide is present in an amount from 5 to 30 parts by weight based on 100 parts by weight of fluorocarbon random copolymer.

6. The fuser member of claim 1 further including an additional filler.

7. The fuser member of claim 1 wherein the fluorocarbon random copolymer is nucleophilic addition cured.

8. The fuser member of claim 1 wherein the fluorocarbon random copolymer is crosslinked by biphenolic residues.

9. The fuser member of claim 1 wherein x is from 40 to 80 mole percent, y is from 10 to 60 mole percent, and z is from 0 to 34 mole percent.

10. The fuser member of claim 1 wherein x is greater than 40 mole percent.

11. The fuser member of claim 1 wherein the curable polyfunctional poly(C1–6 alkyl)siloxane polymer is a heat-curable polymer.

12. The fuser member of claim 1 wherein the curable polyfunctional poly(C1–6 alkyl)siloxane polymer comprises a silicone polymer comprising repeating units of the formula $$(R1)_a SiO_{(4-a)2}$$

wherein R1 is C1–6 alkyl and a is 0–3.

13. The fuser member of claim 12 wherein R1 is methyl.

14. The fuser member of claim 12 wherein the silicone polymer comprises a polydimethylsiloxane having a number average molecular weight of from about 20,000 to about 300,000 and a polymethylsiloxane comprising monofunctional and tetrafunctional siloxane repeating units and having a number-average molecular weight in the range of 1,000 to 10,000.

15. The fuser member of claim 1 wherein the siloxane polymer comprises a silanol- or trimethylsilyl-terminated polymethylsiloxane and is a liquid blend comprising about 60–80 weight percent of a difunctional polydimethylsiloxane having a number-average molecular weight of about 150,000, and 20–40 weight percent of a polytrimethylsilyl silicate resin having monofunctional and tetrafunctional repeating units in an average ratio of about 0.8–1 to 1, and having a number-average molecular weight of about 2,200.

16. The fuser member of claim 1 further including a cushion layer on the core.

* * * * *